Dec. 8, 1931.  A. L. WASHBURNE  1,835,542
OLLA
Filed Sept. 24, 1930   2 Sheets-Sheet 1
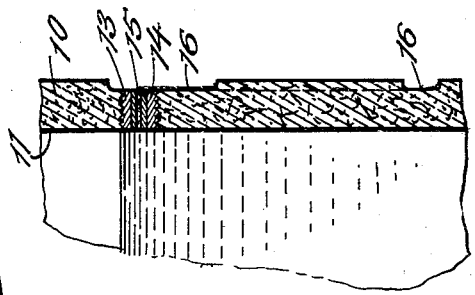
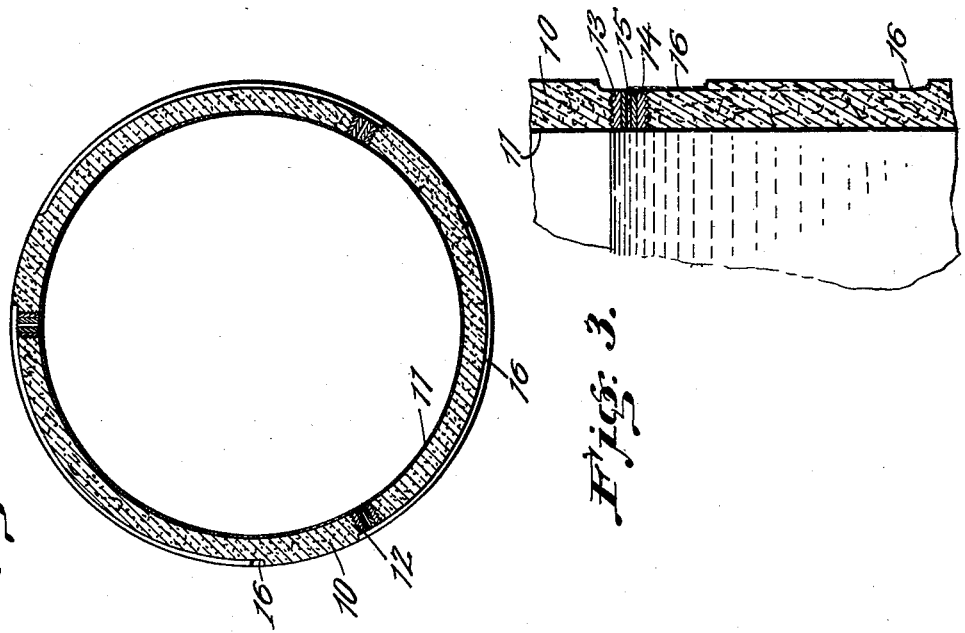
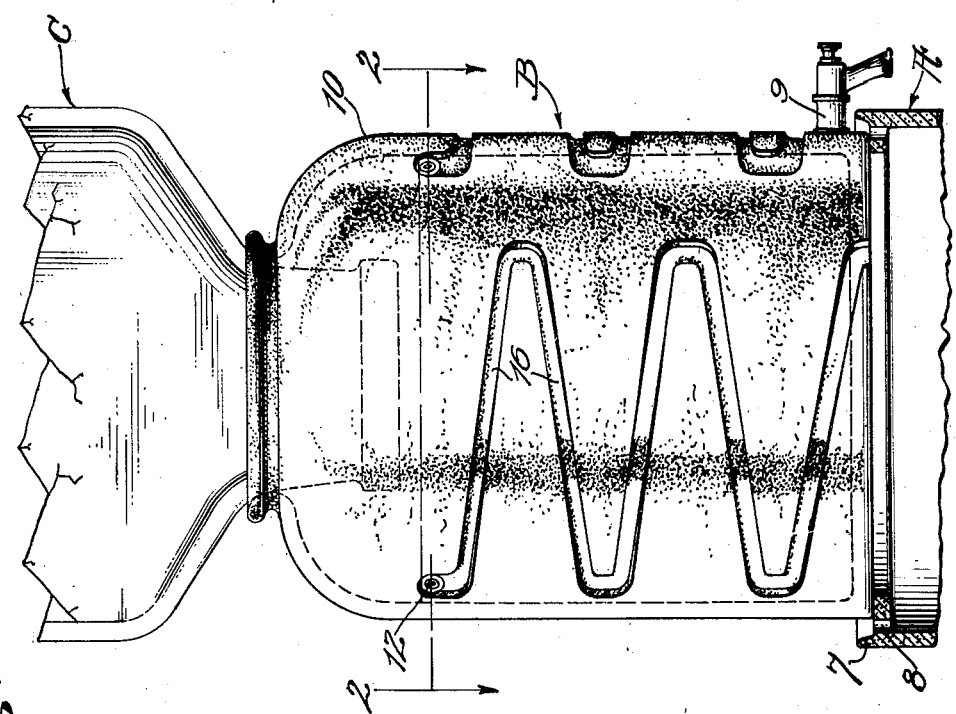
INVENTOR
Arthur L. Washburne.
BY Nestall and Wallace
ATTORNEY Dec. 8, 1931.  A. L. WASHBURNE  1,835,542
OLLA
Filed Sept. 24, 1930  2 Sheets-Sheet 2
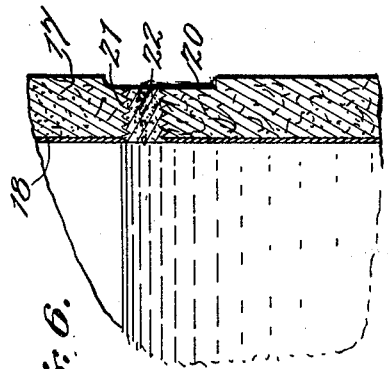
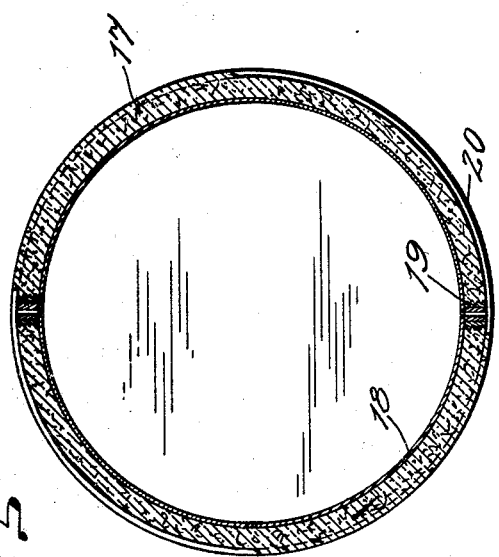
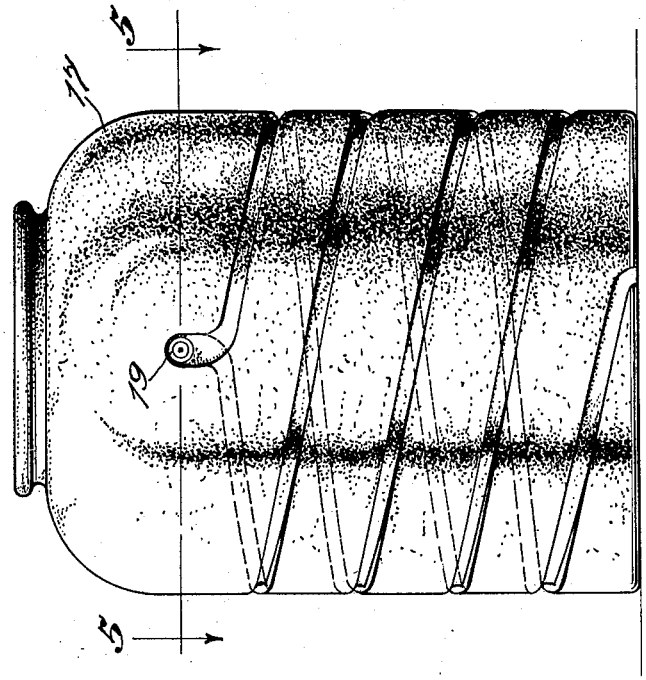
INVENTOR
Arthur L. Washburne
BY Westall and Wallace
ATTORNEY Patented Dec. 8, 1931

1,835,542

UNITED STATES PATENT OFFICE

ARTHUR L. WASHBURNE, OF LOS ANGELES, CALIFORNIA, ASSIGNOR TO SPARKLETTS BOTTLED WATER CORPORATION, OF LOS ANGELES, CALIFORNIA, A CORPORATION OF CALIFORNIA

OLLA

Application filed September 24, 1930. Serial No. 484,124.

This invention relates to an olla and pertains particularly to an olla of the general type wherein a bottle of water is inverted and inserted in the neck of the olla to maintain a supply of water in the latter. Water is then drawn from a faucet at the bottom. It is the general practice to make the olla of porous earthenware so that the vessel sweats, that is, a portion of the water passes through the pores and is evaporated on the exterior of the vessel, thereby maintaining it cool. However, bacteria develops in the pores, dies and decays. This results in generation of fetid gases and in general contaminates the water.

The present invention has for its object the provision of an olla wherein the water contained therein is maintained separate from that employed for evaporation. To this end, I line a porous earthenware vessel with a coat impervious to water and pass water from the inner chamber to the exterior, allowing it to trickle down over the porous layer, be dispersed, absorbed and evaporated.

Embodiments of the invention are illustrated in the accompanying drawings, in which:

Fig. 1 is a side elevation of one form of an olla with a fragment of a bottle and a fragment of the base, the latter being shown in section; Fig. 2 is a section as seen on the line 2—2 of Fig. 1; Fig. 3 is a fragmentary vertical section on an enlarged scale of a wall of the olla shown in Figs. 1 and 2; Fig. 4 is an elevation of a modified form of the olla; Fig. 5 is a section as seen on the line 5—5 of Fig. 4; and Fig. 6 is a section, on an enlarged scale similar to Fig. 3 showing another form of plug.

Referring with more particularity to the drawings and especially, Figs. 1, 2 and 3, the base for an olla is marked A and is of a well known type having a flange 7 and openings 8. The olla denoted by B is placed thereon, the over-all diameter of the olla is such as to leave a trough between the base of the olla and the flange 7 of the base A. A bottle marked C is inverted, being mounted in the neck of the olla. Such an assembly in general is in common use. The olla is provided with the usual faucet 9 for drawing water therefrom.

The invention resides particularly in the olla. As shown in Figs. 1, 2, and 3, it is formed of porous earthenware for its outer layer 10 and is lined with a suitable material such as a glaze 11 making the inner layer impermeable to water. Any other suitable lining such as mastic may be used, as found advisable, its essentials being that it be impervious to water and insoluble herein as well as transmitting no taste thereto. In the upper part of the vessel and a slight distance below the normal water line are tapped bores in which are mounted plugs. These plugs are marked 12 and as shown in Fig. 3 they comprise a threaded body of brass to receive a lead filler 14 having a small opening 15 extending therethrough. There are three plugs, although there may be more or less. In the outer layer 10 are troughs of zig-zag form extending from the plug 12 to the base of the olla. These troughs are marked 16. Water will pass through the openings 15 of plugs 12, trickle downwardly and pass along the troughs, be dispersed and absorbed by the outer layer. The water evaporates and thereby serves as a refrigerant to maintain the water cool within the olla. In this manner the water within the olla is maintained separate from the evaporative water so that bacterial growths will not contaminate the water contained in the olla used for beverage purposes.

Referring to Figs. 4 and 5, the olla shown is formed of a porous outer layer 17 and an impermeable inner layer 18 of the same character as that previously described. Two plugs 19 of the same character as that shown in Figs. 1, 2 and 3 are shown. The structure differs from that previously described, in that, each plug 19 feeds water to a continuous spiral trough 20 extending from the plug to the base. In the structure shown, there is a double spiral, one leading from each plug. The operation of the device is obvious.

In both types of the structure previously described, openings are provided in the plugs. It is apparent, that the amount of water passing through these openings will be dependent upon the head of water above the plug. Due to the fact that with a given olla bottle, the water level is maintained substantially constant until the bottle is drained, the openings may be made of such a size as to pass the proper amount of water. However, the openings could be made adjustable as to size, if so desired. In order to avoid dependence upon the head of water above the plug, the construction shown in Fig. 6 may be used. Tapped holes 21 may be provided. In the bores 21 I inserted plugs 22 of very porous material so that water will be passed into the trough 20.

What I claim is:—

1. An olla comprising a vessel having an outer layer of porous material pervious to moisture and an impermeable inner lining, means to pass water from the interior of said olla to its exterior adjacent the upper end and direct it over the external surface of the outer layer whereby it may trickle downwardly and be absorbed by the outer layer subject to evaporation.

2. An olla comprising a vessel having an outer layer of porous material pervious to moisture and an impermeable inner lining, openings through the walls of said vessel adjacent the upper end, inclined troughs on the external surface of the outer layer extending downwardly for dispersion of water from said openings and absorption by and evaporation from said outer layer.

3. An olla comprising a vessel having an outer layer of porous material pervious to moisture and an impermeable inner lining, plugs in the wall of said vessel adjacent the upper end, to pass water from the interior of said olla to its exterior and direct it over the external surface of the outer layer whereby it may trickle downwardly and be absorbed by the outer layer subject to evaporation.

4. An olla comprising a vessel having an outer layer of porous material pervious to moisture and an impermeable inner lining, plugs extending through the walls of said vessel adjacent the upper end to pass water, inclined troughs on the external surface of the outer layer extending downwardly for dispersion of water from said openings and absorption by said outer layer.

5. An olla comprising a vessel having an outer layer of porous material pervious to moisture and an impermeable inner lining, plugs in the wall of said vessel adjacent the upper end and having bores to pass water from the interior of said olla to its exterior and direct it over the external surface of the outer layer whereby it may trickle downwardly and be absorbed by the outer layer subject to evaporation.

6. An olla comprising a vessel having an outer layer of porous material pervious to moisture and an impermeable inner lining, plugs extending through the walls of said vessel adjacent the upper end and having bores to pass water, inclined troughs on the external surface of the outer layer extending downwardly for dispersion of water from said openings and absorption by said outer layer.

7. An olla comprising a vessel having an outer layer of porous material pervious to moisture and an impermeable inner lining, means to pass water from the interior of said olla to its exterior adjacent the upper end and troughs inset in the external surface of the outer layer whereby water may trickle downwardly and be absorbed by the outer layer subject to evaporation.

8. An olla comprising a vessel having an outer layer of porous material pervious to moisture and an impermeable inner lining, openings through the walls of said vessel adjacent the upper end, inclined troughs inset into the external surface of the outer layer extending downwardly for dispersion of water from said openings and absorption by and evaporation from said outer layer.

In witness that I claim the foregoing I have hereunto subscribed my name this 19th day of September, 1930.

ARTHUR L. WASHBURNE.